United States Patent [19]

Simanskis et al.

[11] 4,090,719
[45] May 23, 1978

[54] PACKING ASSEMBLY

[75] Inventors: Imantas Simanskis, Hillside; Richard K. Caldwell, Arlington Heights, both of Ill.

[73] Assignee: Vapor Corporation, Chicago, Ill.

[21] Appl. No.: 781,565

[22] Filed: Mar. 28, 1977

[51] Int. Cl.² ............................................. F16J 15/18
[52] U.S. Cl. .................................................. 277/125
[58] Field of Search ................................. 277/123–125

[56] References Cited

U.S. PATENT DOCUMENTS

| | | | |
|---|---|---|---|
| 2,188,957 | 2/1940 | Pfauser | 277/124 |
| 2,644,804 | 7/1953 | Rubin | 277/DIG. 6 |
| 3,108,018 | 10/1963 | Lewis | 277/DIG. 6 |
| 3,419,280 | 12/1968 | Wheeler | 277/124 |
| 3,512,787 | 5/1970 | Kennedy et al. | 277/124 |

*Primary Examiner*—Robert I. Smith
*Attorney, Agent, or Firm*—Francis J. Lidd

[57] ABSTRACT

A packing assembly for a pump employed to force fluid at a high velocity includes at least one vee shaped packing ring and a graphite ring positioned adjacent to and abutting the packing ring. These rings are maintained as one unit by first and second adaptors to define the packing assembly. The packing assembly is held at one end by a holder and a second end by a packing nut that is adjustable to apply an axial preload on the packing assembly.

7 Claims, 4 Drawing Figures

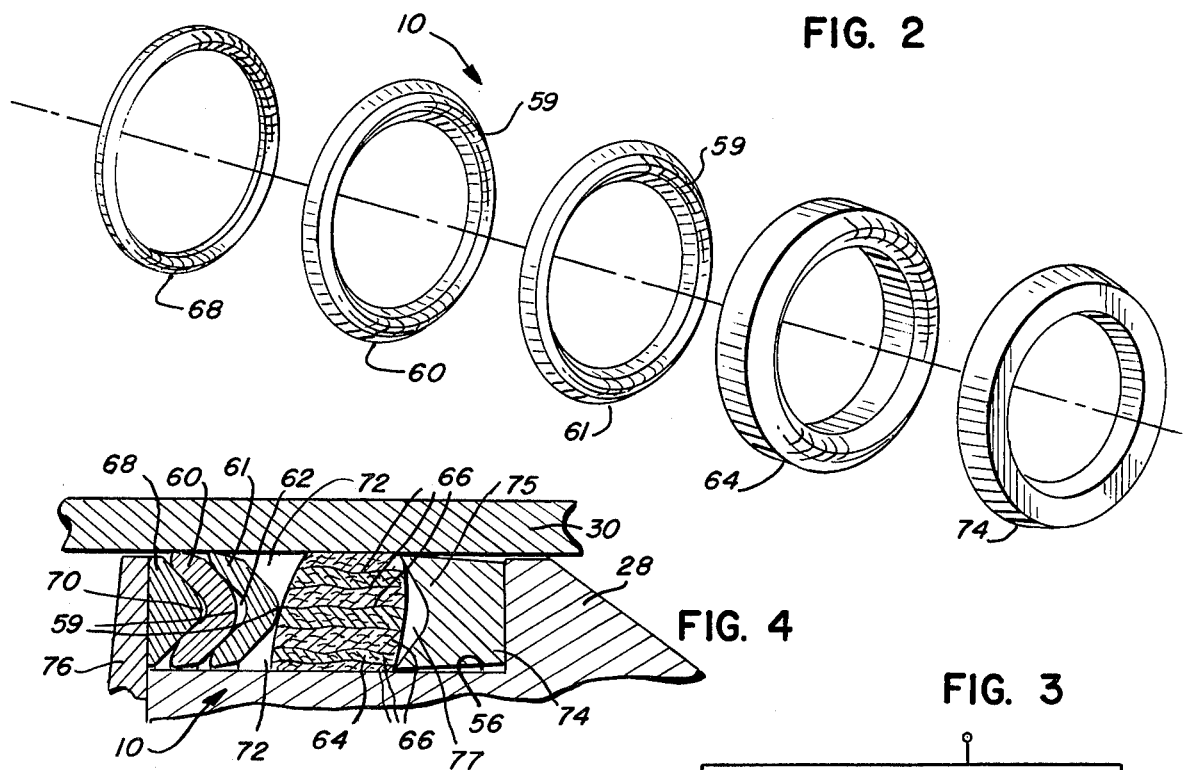
FIG. 2
FIG. 4
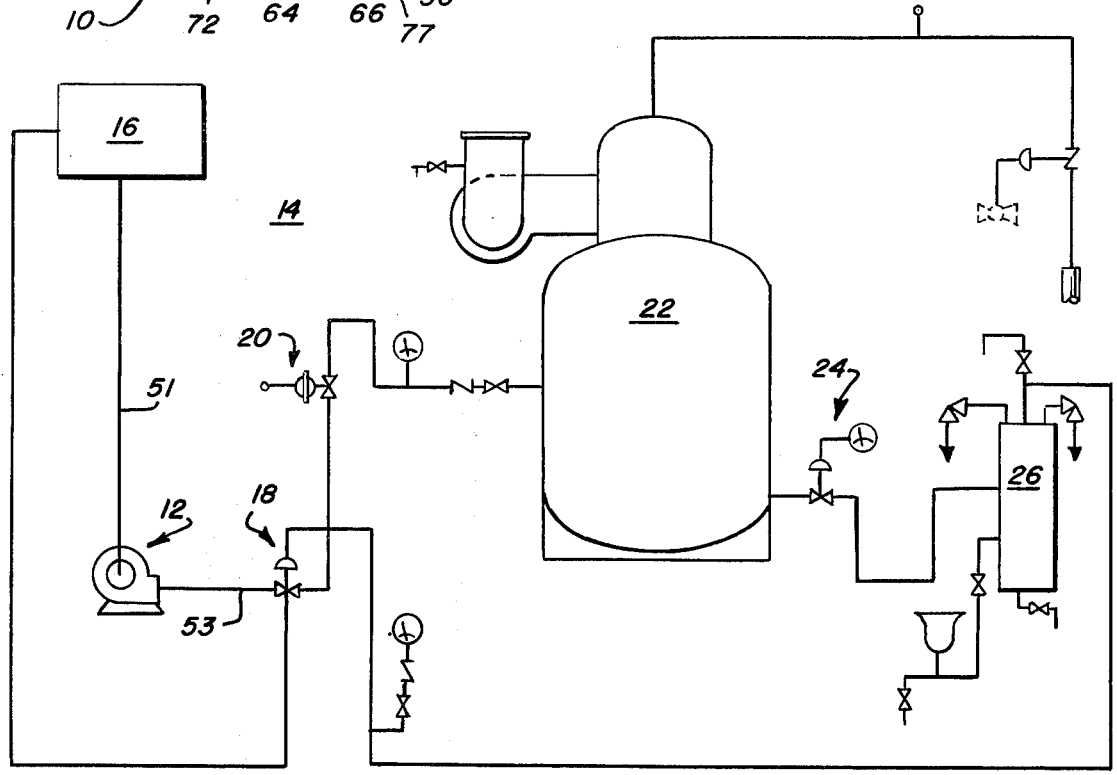
FIG. 3

PACKING ASSEMBLY

BACKGROUND OF THE INVENTION

A. Field of the Invention

The device of the present invention relates to a new and improved packing assembly for a reciprocating pump.

B. Description of the Prior Art

Reciprocating pumps that are employed to force fluid at a high velocity to a water tube boiler under certain conditions of water treatment and water temperature squeal and eventually start to leak. This deterioration of the packing is a result of high temperatures developed by the high speed at which the pump is reciprocated. Examples of reciprocating high pressure and high velocity pumps of this type are illustrated in U.S. Pat. Nos. 3,558,244 and 3,652,188.

One prior art method of reducing the deleterious effects of rapid reciprocation with the resultant drying of the packing is to apply lubricating oil to the back or dry side of the packing. This stops the squeal and extends the life of the packing; however, these results are only temporary. These deleterious effects are also increased when the packing is used in a pump that is forcing water at near boiling temperatures to boilers. A further result is that the lack of lubrication not only heats the packing but also raises the temperature of the cylinder wall of the pump increasing the risk of damage to the pump.

A further difficulty experienced in prior art reciprocating pumps is that the piston is freely carried on the piston rod and experiences side motion and cocking during operation of the pump. This action is also experienced by the packing holder and contributes to the deterioration of the various components of the packing assembly.

SUMMARY OF THE INVENTION

An object of the present invention is to provide a new and improved packing assembly for reciprocating pumps.

Another object of the present invention is to provide a constant preload on the packing assembly over a prolonged period of time in order to reduce the side motion and cocking experienced by the packing holder.

A further object of the present invention is to provide cylinder wall lubrication to reduce the friction between the packing and the cylinder wall of a reciprocating pump thereby lowering cylinder wall temperature.

An additional object of the present invention is to provide proper cylinder lubrication to eliminate packing noise during operation of a high speed pump.

Briefly, the present invention is directed to a new and improved packing that is employed in high speed, high pressure fluid pumps that force fluid such as water at a high velocity to a boiler.

The packing assembly includes one or more molded fabric reinforced vee rings that are abutting a graphite ring. This assembly of rings is held in a stationary position relative to each other by male and female adaptors positioned at opposite ends of the assembly. The packing assembly is held in a groove defined on the piston of the pump and maintained stationary relative to the cylinder by an adjustable packing nut that is employed to apply an axial preload to the packing assembly.

BRIEF DESCRIPTION OF THE DRAWINGS

The above and other objects and advantages of the present invention will become apparent from the following detailed description of the preferred embodiment of the invention illustrated in the accompanying drawings, wherein:

FIG. 2 is an enlarged, exploded view of the packing assembly;

FIG. 3 is a schematic illustration of a water tube boiler system that employs a reciprocating pump of the type using the packing assembly of the present invention; and FIG. 4 is a cross-sectional view of the packing assembly in its assembled configuration.

DESCRIPTION OF THE PREFERRED EMBODIMENT

Figure 1:
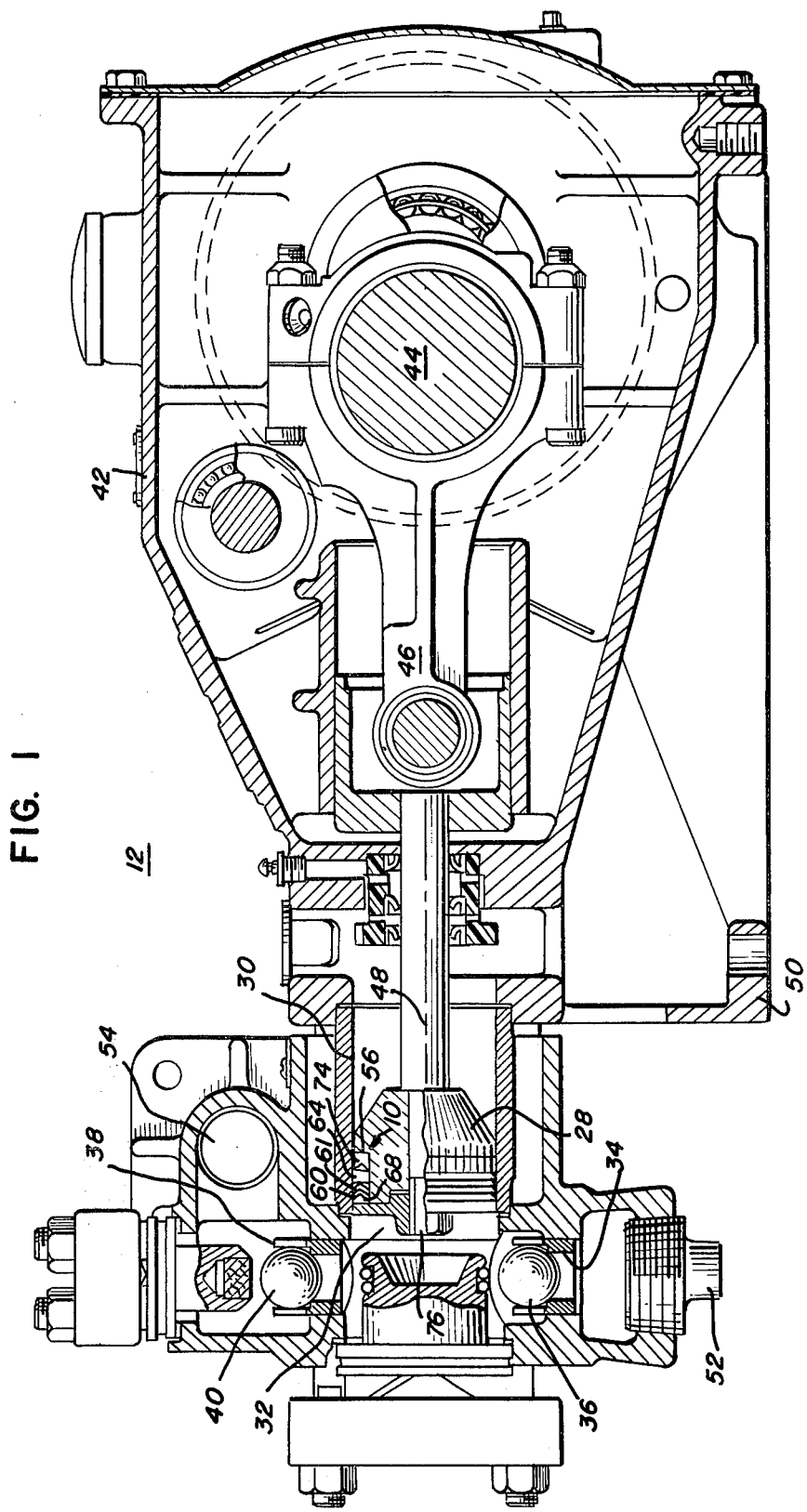
FIG. 1 is a cross-sectional view of a high pressure, reciprocating piston including a packing assembly constructed in accordance with the principles of the present invention.

With reference now to the drawings and in particular FIG. 2, there is illustrated a self-lubricating packing generally designated by the reference numeral 10.

The packing 10 may be employed in reciprocating piston pumps of the type generally designated by the reference numeral 12 and employed in water tube boiler systems as illustrated in FIG. 3 and generally designated by the reference numeral 14.

The boiler system 14 uses the piston pump 12 to pump water from the reservoir 16 at a high velocity through a pressure control 18 and a fuel control 20 into a coil assembly (not shown) in the boiler 22 wherein the water is converted into steam. The steam is then forced through the temperature limit control 24 to the separator 26 and the unevaporated water is separated from the steam. The resultant dry steam is delivered from the separator 26 to a steam utilization device (not shown).

Pumps similar to piston pump 12 are disclosed in U.S. Pat. Nos. 3,558,244 and 3,652,188 and reference may be had to those patents for a more detailed description. Briefly, however, the piston pump 12 (FIG. 1) incorporates a reciprocating piston 28 that is reciprocated in a piston cylinder 30. The piston 28 is in communication with a pump chamber 32 to interact with fluid. The chamber 32 includes a fluid inlet 34 for the introduction of fluid. During that portion of the pump stroke that the piston 28 is drawn out of the chamber 32, fluid is drawn through the inlet 34 and across a one-way ball valve 36 into the chamber 32. The chamber 32 also includes a fluid outlet 38 and during the withdrawing action, the chamber outlet 38 is closed by a ball valve 40 preventing reverse flow into the chamber 32.

During the compression or forward stroke of the pump 12 wherein the piston 28 is reciprocated into the chamber 32, the resulting pressure forces the ball valve 40 out of its seat in the outlet 38, whereas the ball valve 36 is forced into sealing engagement with the inlet 34. In this manner, fluid is pumped out the outlet 34 and to the controls 18 and 20 as illustrated in FIG. 3.

To reciprocate the piston 28, the piston pump 12 includes a crank shaft housing 42 that houses a main shaft 44 that is connected to a high speed source of rotary power such as an electric motor (not shown). The crank shaft 44 is connected to a driving pitman 46 that in turn is connected to a piston rod 48. In this manner, the rotary motion of the shaft 44 is transferred to the piston 28 reciprocating it within the piston cylinder 30.

The entire pump 12 may be secured in the system 14 by a base 50 that in turn may be secured to any desired surface. To couple the pump 12 to the system 14 an inlet coupling 52 is secured to the pump 12 in communication with the inlet 32 and is coupled to a conduit 51 in fluid communication with the reservoir 16. The pump 12 also includes an outlet coupling 54 that may be coupled to a conduit 53 that is coupled to the control 18. The piston 28 may then pump the fluid at a high velocity through the outlet 40 and through the outlet coupling 54 to the various components of the system 14.

The pump 12 as described operates at rapid rates of reciprocation of the piston 28. To allow the piston 28 to reciprocate freely within the piston cylinder 30 and to prevent leakage of fluid across the piston 28, the packing 10 is provided. The packing 10 is positioned within a groove 56 defined around the outer periphery of the piston 28 and at the interface between the piston 28 and the cylinder wall 30. The packing 10 is self-lubricating so as to overcome the problems of squealing and rapid deterioration experienced by prior art packings and due to the drying of the packing.

The packing assembly 10 comprises first a plurality of molded, fabric reinforced packing rings 60 and 61. These packing rings 60 and 61 have vee, chevron, or apex configurations and are aligned within the groove 56 such that their respective apexes 59 are axially aligned. In this manner, there are channels 62 defined between adjacent packing rings 60 and 61. During operation of the pump 12, these channels 62 provide conduits for fluid flow providing lubrication of the rings 60 and 61 and thus preventing drying of the rings 60 and 61. In addition, this fluid flow in the channels 62 serves to dissipate heat from the cylinder wall 30 to cool the pump 12. In the illustrated embodiment, two packing rings 60 and 61 are disclosed; however, more packing rings may be desired depending on the requirements of the particular pump 12.

To provide further lubrication at the interface between the piston 28 and cylinder 30, a graphite ring 64 is also positioned within the groove 56 and adjacent to the packing rings 60 and 61. The graphite ring 64 comprises a winding or laminations 66 of graphite tape. The ring 64 is fabricated by winding the graphite tape around a form in a fixed cavity and compressing the laminations 66 to an extremely high density. As a result of the compression the horizontal laminations 66 are vee shaped or undulated.

An additional advantage provided by the graphite ring 64 is the high thermal conductivity of graphite results in the ring 64 serving the function of reducing the heat buildup at the interface of the piston 28 and the cylinder 30. In addition, in this assembly of the rings 60, 61 and 64 there are also channels 72 defined between the apex of the packing ring 61 and the graphite ring 64 that define channels substantially similar in configuration and function to the channel 62 that further reduce the heat buildup.

To maintain the packing rings 60 and 61 and the graphite ring 64 as one unit, a male adaptor 68 may be positioned at one end of the packing 10 so as to abut the rearmost packing ring 60. The male adaptor 68 is of a configuration substantially similar to the vee rings 60 and 61 and defines between the apex of the adaptor 68 and packing ring 60 a channel 70 that performs a function similar to that of the channels 62.

At the forwardmost end of the packing 10 and adjacent to the graphite ring 64, there is a female adaptor 74 that is positioned between the frontmost end of the graphite ring 64 and the end of the groove 56. The female adaptor 74 includes a groove or indention 75 that defines a channel 77 between the graphite ring 64 and the female adaptor 74. The interaction of the female and male adaptors 68 and 74 maintain the packing 10 within the groove 56 as a single unit.

To ensure a secure seal of the packing 10 against the innerface of the piston cylinder 30 and to ensure that the graphite ring 64 is radially expanded against the inner periphery of the piston cylinder 30 thereby lubricating that surface, a tightening nut 76 is threadably secured to the end of the piston rod 48. This tightening nut 76 may be adjusted to apply an axial preload on the packing 10 causing a radial expansion of the packing rings 60 and 61 and the graphite ring 64. The graphite ring 64 particularly expands under this axial preload due to the horizontally or axially laminated configuration of the laminations 66. Moreover, the vee shape or undulations of the laminations 66 resist shearing of the graphite ring 64 during reciprocation of the piston 28.

As wear of the packing 10 occurs during prolonged operation of the pump 12, the adjusting nut 76 may be further tightened to increase the axial load on the packing 10 causing further radial expansion of the packing 10 to accomodate this wear.

During operation of the pump 12 the channels 62, 70, and 72 are filled with lubricating fluid. This fluid serves to lubricate the packing 10 and prevent drying and, thus, the resultant deterioration and squealing. In addition, the outer peripheral surface of the graphite ring 64 deposits graphite on the cylinder wall 30 during the reciprocating motion to provide lubrication between the surfaces further preventing deterioration and the squealing noise. The fluid within the channels 62, 70, and 72 provides dispersion channels for graphite particles torn from the graphite ring 64 providing additional lubrication of the contact surface between the packing 10 and cylinder wall 30. The graphite particles are retained in the packing assembly 10 by the female adaptor 74 allowing continued lubrication.

It is also believed that during operation of the pump 12, the channel 77 fills up with fluid and provides a cushion against which the graphite ring 64 abuts. Furthermore, during the compression stroke of the pump 12, the male adaptor 68 forces the leading edge of the packing 10 and the graphite ring 64 radially outward against the cylinder wall 30. Simultaneously, the female adaptor 74 pushes the graphite ring 64. The net effect is a rocking of the ring 64 further assisting the lubricating effect of the graphite ring 64.

While the invention has been described with reference to details of the illustrated embodiment, it should be understood that such details are not intended to limit the scope of the invention as defined in the following claims.

What is claimed and desired to be secured by Letters Patent of the United States is:

1. A self lubricating packing for first and second coaxial members, said second member being mounted telescopically within said first member and reciprocated relative to said first member, said packing comprising:
   a plurality of packing rings disposed around said second member and in abutting relationship, said rings defining a packing assembly having first and second ends;

a male adaptor abutting a first packing ring, said rings being of a chevron cross-sectional configuration with the first packing ring positioned over said male adaptor defining a channel therebetween for the flow of lubrication, said remaining rings being stacked on each other to define lubrication channels therebetween for the flow of lubrication therethrough;

a lubrication member disposed around said second member and adjacent said first end of said packing assembly; and a compression member threadably secured on said second member and abutting said second end of said packing assembly for applying a compressive load on said packing assembly and said lubrication member.

2. The packing set forth in claim 1 wherein said lubrication member being of a generally square cross-sectional configuration and comprising vee shaped laminations of graphite material.

3. In a reciprocating piston pump including a pump cylinder and a piston mounted for reciprocal movement therein, the improvement comprising:

a groove defined in the periphery of said piston;

a packing mounted in said groove, said packing including a plurality of packing rings of a generally vee axial cross-sectional configuration;

a lubrication ring mounted in said groove and adjacent said rings;

a first adaptor ring in said groove adjacent said packing rings of substantially the same configuration as said packing rings;

a second female adaptor ring in said groove and adjacent said lubricating ring; and a compression member mounted in said groove and threaded on said piston to apply an axial compression load on said packing;

said lubrication ring being substantially of a square configuration and defining a channel between said lubrication ring and said female adaptor ring to allow flow of lubricating fluid therethrough and to allow rocking of said lubricating ring relative to said packing.

4. The improvement claimed in claim 3, said lubricating ring comprising a plurality of laminations of graphite material, said laminations being of a generally vee shaped axial configuration.

5. The improvement claimed in claim 3, said adjacent packing rings defining channels therebetween and between said packing rings and said lubricating ring for the flow of lubricating fluid therethrough.

6. The improvement claimed in claim 3 further comprising a packing holder mounted in said groove defining a stop against which said compressive load is applied.

7. The improvement claimed in claim 3 wherein said second adaptor ring includes an indention defining a chamber between said lubricating ring and said second adaptor, said chamber filling with fluid during operation of said pump and imparting a force on said lubricating ring to rock said lubricating ring relative to said packing.

* * * * *